United States Patent Office 3,130,198
Patented Apr. 21, 1964

3,130,198
PROCESS FOR THE PURIFICATION OF CYCLOSERINE
Roger L. Harned, Terre Haute, Ind., assignor to Commercial Solvents Corporation, New York, N.Y., a corporation of Maryland
No Drawing. Filed Aug. 18, 1961, Ser. No. 132,291
4 Claims. (Cl. 260—307)

My invention relates to the antibiotic cycloserine and more particularly it relates to a process for recovering substantially iron-free cycloserine from aqueous solutions thereof containing iron by removal of iron as a complex of 8-hydroxyquinoline.

The antibiotic cycloserine is a broad spectrum antibacterial agent possessing activity against both gram-negative and gram-positive bacteria including mycobacteria and has been found to be particularly effective in the treatment of tuberculosis and urinary tract infections in man. The antibiotic is produced by a species of microorganism which has been designated *Streptomyces orchidaceous*. The antibiotic is an amphoteric substance possessing both a weakly acid and a weakly basic group, the antibiotic being very soluble in water but essentially insoluble in most common organic solvents such as glycerols, isopropyl alcohol, methanol, ethanol, acetone, hexane, benzene, chloroform, ether, petroleum ether, dioxane, 1-butanol, ethyl acetate, and ethylene dichloride. The antibiotic melts with decomposition at about 153–156° C.

Cycloserine is recovered from aqueous solutions thereof including the nutrient media in which it is produced, by adsorption of the antibiotic from the aqueous solution on a strongly acidic cation exchange resin in hydrogen form and elution of the antibiotic from the cation exchange with a dilute base, such as sodium hydroxide, thereby effecting a considerable concentration of the antibiotic in an aqueous solution from which it can be recovered by precipitation as a water-insoluble metal salt. Free cycloserine can then be obtained from the metal salt by precipitating the metal ion as an insoluble salt to liberate cycloserine which goes into solution as free cycloserine. The cycloserine can then be crystallized by adding to the solution a water-miscible solvent in which cycloserine is insoluble.

The color of cycloserine produced and recovered in the above manner is not white which is the color of pure material. It has been discovered that during production and recovery, cycloserine picks up small amounts of iron which cause the final product to take on colors ranging from light pink to even deep red depending on the amounts of iron present in the material thus making the product unacceptable as a high-grade pharmaceutical. It has been determined that the major source of iron has been from steel vessels and other ferrous metal equipment utilized throughout the process. Therefore, it has become necessary in order to produce a product not having undesirable color characteristics to utilize only specially designed expensive glass equipment throughout the entire production and recovery procedure.

I have now discovered a process whereby substantially iron-free, white cycloserine can be produced. My new process permits the use of steel vessels and other ferrous metal equipment throughout the entire process. Further my process does not adversely affect the yields or the quality of the final product.

My new process for the recovery of cycloserine involves essentially treating aqueous solutions containing cycloserine with 8-hydroxyquinoline to form a water-insoluble complex of iron with the 8-hydroxyquinoline, removing the water-insoluble complex from the cycloserine-containing aqueous solution, and then recovering white crystalline cycloserine.

In carrying out my invention, I prefer to first remove all impurities other than iron before my 8-hydroxyquinoline treatment so as to minimize further iron contamination in later purification steps. Thus, in recovering cycloserine from its fermentation medium I can first adjust the pH of the fermentation medium to between 3.0 and 6.0 with any suitable acid such as sulfuric acid, phosphoric acid and the like. I then adsorb the antibiotic from the aqueous solution on a strongly acidic cation exchange resin such as an aldehyde-polyhydric phenol resin wherein the activity is due to the presence of sulfonic acid groups. Following adsorption of cycloserine on the strongly acidic cation-exchange resin, I then elute the antibiotic from the resin employing a dilute aqueous solution of a base such as for example, sodium hydroxide, ammonium hydroxide, etc. Following elution of cycloserine from the strongly acidic cation exchange resin, the cycloserine can be further purified by precipitating cycloserine as a water-insoluble metal salt. Suitable metallic cations which form insoluble salts with cycloserine include silver, copper, mercury, zinc, and aluminum and water-soluble salts of these metals can be added to the aqueous solution of the antibiotic and the antibiotic precipitated as the metal salt of the metal employed. A solution of free cycloserine can then be formed by removing the insoluble metal salt of cycloserine from the supernatant by any convenient means such as filtration, centrifugation, etc., slurrying the insoluble metal salt of cycloserine in water, and adding a material thereto capable of precipitating the metal ion as an insoluble salt thus liberating cycloserine which goes into solution in the water present. For example, the silver salt of cycloserine can be slurried in water and hydrochloric acid added thereto. The silver precipitates as silver chloride while the cycloserine goes into aqueous solution in the free acid form. After partial purification of cycloserine as described above, 8-hydroxyquinoline is added to the cycloserine-containing aqueous solution to remove iron as a water-insoluble complex with 8-hydroxyquinoline. Along with the addition of 8-hydroxyquinoline, it is often preferable to remove any residual traces of other metal ions by treating the solution with hydrogen sulfide. The water-insoluble iron-8-hydroxyquinoline complex and the water-insoluble metal sulfide can then be removed from the aqueous cycloserine solution by filtration. The cycloserine can then be recovered from the aqueous solution by freeze-drying under vacuum or the cycloserine can be crystallized from the aqueous solution by adding to the solution a water-miscible solvent such as isopropyl alcohol in which cycloserine is insoluble.

The amount of 8-hydroxyquinoline which can be satisfactorily utilized in my process will naturally depend on the amount of iron in the aqueous cycloserine solution. Generally speaking, amounts as low as 0.1% by weight of 8-hydroxyquinoline, based on the weight of cycloserine in the solution, have been found to be operative in my process. Although an excess of 8-hydroxyquinoline is not harmful, it has been found that under normal operating conditions, no more than 2% by weight of 8-hydroxyquinoline would ever be necessary to remove all iron in the cycloserine solution. I have found, however, that suitable results are generally obtained when from about 0.5 to about 1.0 by weight of 8-hydroxyquinoline based on the weight of cycloserine is utilized in the process.

The following examples are offered to illustrate my invention. However, I do not intend to be limited to the specific materials or procedures shown therein, but rather it is intended for my invention to include all equivalents within the scope of this specification and the attached claims.

Example I

A 100-gram portion of partially purified cycloserine having a pinkish-red color was dissolved in 1,000 ml. of water. The resulting solution gave a light transmission at 540 millimicrons of 69%, when compared to distilled water. To the solution were added 150 milligrams of 8-hydroxyquinoline with accompanying agitation. A greenish solid precipitate was formed and removed from the solution by filtration. The light transmission of the filtered solution at 540 millimicrons was then shown to be 96% when compared to distilled water. The filtered solution was then added to a 2,000-milliliter portion of isopropyl alcohol with accompanying agitation to precipitate white crystalline cycloserine.

Example II

To a 1,000-milliliter portion of partially purified aqueous cycloserine solution containing 100 grams of cycloserine having a light transmission of 52% at 540 millimicrons, when compared to distilled water, were added 250 milligrams of 8-hydroxyquinoline with accompanying agitation. A water-insoluble green precipitate was formed and was removed from the solution by filtration. The thus treated solution was then shown to have a light transmission of 94% at 540 millimicrons when compared to distilled water. The filtered solution was then added to a 2,000-milliliter portion of isopropyl alcohol with accompanying agitation to precipitate white crystalline cycloserine.

Now having described my invention, what I claim is:

1. A process for the purification of cycloserine which comprises treating an aqueous solution of cycloserine containing small amounts of iron with 8-hydroxyquinoline to form a water-insoluble complex of iron and 8-hydroxyquinoline, and removing the said water-insoluble complex from the said aqueous solution.

2. A process for the purification of cycloserine which comprises treating an aqueous solution of cycloserine containing iron with from about 0.1 to about 2.0% by weight of 8-hydroxyquinoline based on the weight of the cycloserine to form a water-insoluble complex of iron and 8-hydroxyquinoline, removing the water-insoluble complex from the aqueous solution and recovering cycloserine.

3. The process of claim 2 wherein the amount of hydroxyquinoline ranges from about 0.5 to about 1.0% by weight.

4. In a process for the recovery of cycloserine from an impure aqueous solution containing iron by adsorbing cycloserine on a strongly acidic cation exchange resin, eluting the cycloserine from the resin, precipitating cycloserine from the eluate as a water-insoluble salt, forming an aqueous solution of free cycloserine, and recovering free cycloserine therefrom, the improvement which comprises adding 8-hydroxyquinoline to the free cycloserine solution to form a water-insoluble complex of iron and 8-hydroxyquinoline, removing the water-insoluble complex from the solution and recovering cycloserine.

References Cited in the file of this patent

UNITED STATES PATENTS

| | | |
|---|---|---|
| 2,773,878 | Shull et al. | Dec. 11, 1956 |
| 2,789,983 | Harned | Apr. 23, 1957 |
| 2,939,868 | Hegedus | June 7, 1960 |

OTHER REFERENCES

Day et al.: "Quantitative Analysis," (Prentice-Hall), pp. 219–220 (1958).

Motojima: Chem. Abstracts, vol. 53, col. 19693 (1959).